(12) United States Patent
Yamada

(10) Patent No.: US 11,880,254 B2
(45) Date of Patent: *Jan. 23, 2024

(54) SWITCHING GROUPS OF MULTIPLE OUTPUT TERMINALS IN A POWER SUPPLY SYSTEM BASED ON DETECTED ANOMALY

(71) Applicant: ROHM CO., LTD., Kyoto (JP)

(72) Inventor: Takumi Yamada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,084

(22) Filed: Mar. 15, 2022

(65) Prior Publication Data

US 2022/0300056 A1 Sep. 22, 2022

(30) Foreign Application Priority Data

Mar. 18, 2021 (JP) ................................ 2021-044854

(51) Int. Cl.
| | |
|---|---|
| G06F 1/30 | (2006.01) |
| G06F 1/329 | (2019.01) |
| G06F 1/3206 | (2019.01) |
| B60L 3/00 | (2019.01) |

(52) U.S. Cl.
CPC ............ *G06F 1/305* (2013.01); *B60L 3/0046* (2013.01); *G06F 1/3206* (2013.01); *G06F 1/329* (2013.01)

(58) Field of Classification Search
None
See application file for complete search history.

(56) References Cited

U.S. PATENT DOCUMENTS

| | | | | |
|---|---|---|---|---|
| 4,646,299 A | * | 2/1987 | Schinabeck | G01R 31/31922 702/120 |
| 8,448,001 B1 | * | 5/2013 | Zhu | G06F 1/3206 713/323 |
| 10,637,462 B1 | * | 4/2020 | Pulipati | H03K 19/01759 |
| 2006/0075267 A1 | * | 4/2006 | Tokue | G06F 1/3203 713/300 |
| 2009/0315399 A1 | * | 12/2009 | Shikata | G06F 1/3287 307/38 |
| 2010/0231044 A1 | * | 9/2010 | Tatsumi | G06F 1/3287 307/39 |
| 2011/0022826 A1 | * | 1/2011 | More | G06F 1/26 713/1 |
| 2014/0252853 A1 | * | 9/2014 | Meunier | G06F 1/263 307/24 |

(Continued)

FOREIGN PATENT DOCUMENTS

JP 2015-195690 A 11/2015

*Primary Examiner* — Danny Chan
(74) *Attorney, Agent, or Firm* — Fish & Richardson P.C.

(57) ABSTRACT

A power supply system of the present disclosure includes: a plurality of output terminals, configured to output an output voltage; a group setting circuit, configured to group the plurality of output terminals; an anomaly detection circuit, configured to detect anomaly; and a control circuit, configured to stop an output from the output terminals belonging to groups in which an anomaly is detected by the anomaly detection circuit, and maintain an output from the output terminals belonging to groups in which an anomaly is not detected by the anomaly detection circuit.

13 Claims, 8 Drawing Sheets

(56) References Cited

U.S. PATENT DOCUMENTS

| | | | | |
|---|---|---|---|---|
| 2015/0370306 A1* | 12/2015 | Wang | .................... | G06F 1/3206 |
| | | | | 713/320 |
| 2019/0064902 A1* | 2/2019 | Jeon | ........................ | G06F 1/26 |
| 2020/0373753 A1* | 11/2020 | Gao | ........................ | H02H 7/30 |
| 2021/0208658 A1* | 7/2021 | Sato | ....................... | H02M 3/156 |
| 2021/0271276 A1* | 9/2021 | Seok | ........................ | G06F 1/26 |
| 2021/0407584 A1* | 12/2021 | Kim | ....................... | G11C 7/222 |

\* cited by examiner

| Device ID | Description | Address |
|---|---|---|
| 3'b000 | PN1(Master) | 0x60 |
| 3'b001 | PN1(Slave0) | 0x61 |
| 3'b010 | PN2(Master) | 0x62 |
| 3'b011 | PN2(Slave1) | 0x63 |
| 3'b100 | PN2(Slave2) | 0x64 |
| 3'b101 | PN2(Slave3) | 0x65 |
| 3'b110 | PN2(Slave4) | 0x66 |
| 3'b111 | PN2(Slave5) | 0x67 |

| System Number | System | | |
|---|---|---|---|
| 0 | 1 Chip | Master (PN1) | 7ch |
| 1 | 1 Chip | Master (PN2) | 2ch |
| 2 | 2 Chip | Master (PN1)/ Slave 1 (PN2) | 9ch |
| 3 | 2 Chip | Master (PN1)/ Slave 0 (PN1) | 14ch |
| 4 | 3 Chip | Master (PN1)/ Slave 1 (PN2)/ Slave 2 (PN2) | 11ch |
| 5 | 3 Chip | Master (PN1)/ Slave 0 (PN1)/ Slave 1 (PN2) | 16ch |
| 6 | 4 Chip | Master (PN1)/ Slave 1 (PN2)/ Slave 2 (PN2)/ Slave 3 (PN2) | 13ch |
| 7 | 4 Chip | Master (PN1)/ Slave 0 (PN1)/ Slave 1 (PN2)/ Slave 2 (PN2) | 18ch |
| 8 | 5 Chip | Master (PN1)/ Slave 1 (PN2)/ Slave 2 (PN2)/ Slave 3 (PN2)/ Slave 4 (PN2) | 15ch |
| 9 | 5 Chip | Master (PN1)/ Slave 0 (PN1)/ Slave 1 (PN2)/ Slave 2 (PN2)/ Slave 3 (PN2) | 20ch |
| 10 | 6 Chip | Master (PN1)/ Slave 1 (PN2)/ Slave 2 (PN2)/ Slave 3 (PN2)/ Slave 4 (PN2)/ Slave 5 (PN2) | 17ch |
| 11 | 6 Chip | Master (PN1)/ Slave 0 (PN1)/ Slave 1 (PN2)/ Slave 2 (PN2)/ Slave 3 (PN2)/ Slave 4 (PN2) | 22ch |

FIG. 3

SWITCHING GROUPS OF MULTIPLE OUTPUT TERMINALS IN A POWER SUPPLY SYSTEM BASED ON DETECTED ANOMALY

TECHNICAL FIELD

The subject matter of the present disclosure relates to a power supply system including a plurality of output channels.

BACKGROUND

A power management integrated circuit (PMIC) is commonly used as a power supply system having a plurality of output channels. In general, when an anomaly is present, a PMIC is capable of autonomously turning off a power supply system, which is a function independent from other devices (for example, referring to patent publication 1). That is, in case of an anomaly, a PMIC usually simultaneously stops an output of output voltages from all output channels.

PRIOR ART DOCUMENT

Patent publication

[Patent publication 1] Japan Patent Publication No. 2015-195690 (paragraph [0005])

SUMMARY OF THE PRESENT DISCLOSURE

Problems to be Solved by the Present Disclosure

However, according to specifications of a load (for example, a system-on-chip (SoC)) arranged at a back-end of a PMIC, such simultaneous stop of an output of output voltages from all output channels by the PMIC in case of an anomaly is not desired.

Technical Means for Solving the Problem

A power supply system of the present disclosure is configured as (a first configuration) including: a plurality of output terminals, configured to output an output voltage; a group setting circuit, configured to group the plurality of output terminals; an anomaly detection circuit, configured to detect anomaly; and a control circuit, configured to stop an output from the output terminals belonging to groups in which an anomaly is detected by the anomaly detection circuit, and maintain an output from the output terminals belonging to groups in which an anomaly is not detected by the anomaly detection circuit.

The power supply system of the first configuration above may also be configured (a second configuration) such that, when the power supply system is switched from an enabled state to a disabled state, the control circuit is configured to sequentially stop outputs from the plurality of output terminals belonging to all of the groups.

The power supply system of the first or second configuration above may also be configured (a third configuration) such that, after the output from the output terminals belonging to the groups in which the anomaly is not detected by the anomaly detection circuit is maintained, the control circuit is configured to sequentially stop the output from the output terminals belonging to at least one of the groups in which the anomaly is not detected by the anomaly detection circuit.

The power supply system of any one of the first to third configurations above may also be configured as (a fourth configuration) further comprising a plurality of semiconductor integrated circuits (ICs), wherein a number of the plurality of output terminals is greater than a number of the plurality of semiconductor ICs, and the plurality of output terminals are distributed and arranged in the plurality of semiconductor ICs.

The power supply system of the fourth configuration above may also be configured as (a fifth configuration) further comprising a first transmission line, and a second transmission line, wherein the plurality of semiconductor ICs include a single first semiconductor IC and at least one second semiconductor IC, the single first semiconductor IC is configured to supply a clock signal to the at least one second semiconductor IC via the first transmission line, and based on the clock signal, one of the single first semiconductor IC and the at least one second semiconductor IC is configured to transmit data via the second transmission line to the remaining semiconductor IC.

The power supply system of the fifth configuration above may also be configured such that, each of the plurality of semiconductor ICs includes a storage circuit that stores whether the semiconductor IC itself is set to the first semiconductor IC or the second semiconductor IC (a sixth configuration).

The power supply system of any one of the first to third configurations above may also be configured as further comprising a single semiconductor IC, wherein the plurality of output terminals are arranged in the single semiconductor IC (a seventh configuration).

A vehicle provided by the present disclosure is configured to comprise the power supply system of any one of the first to seventh configurations (an eighth configuration).

Effects of the Present Disclosure

According to the subject matter of the present disclosure, a power supply system having a degree of freedom for processing in case of an anomaly is provided.

BRIEF DESCRIPTION OF THE DRAWINGS

FIG. 3 is an exemplary diagram of system serial numbers.

DETAILED DESCRIPTION OF THE EMBODIMENTS

Figures 1, 2:
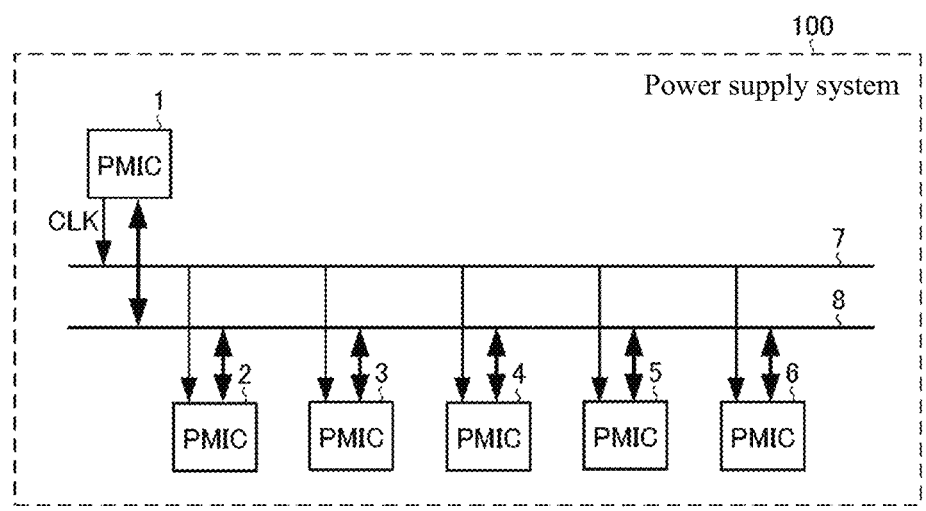
FIG. 1 is a brief configuration diagram of a power supply system according to an embodiment.
FIG. 2 is an exemplary diagram of device IDs.

FIG. 1 shows a brief configuration diagram of a power supply system according to an embodiment. A power supply system 100 shown in FIG. 1 includes power management integrated circuits (PMICs) 1 to 6, a first transmission line 7 and a second transmission line 8. The first transmission line 7 and the second transmission line 8 form a communication bus.

Each of the PMICs 1 to 6 includes at least one output terminal for outputting an output voltage. Each of the PMICs 1 to 6 further includes an input terminal for inputting an input voltage. Each of the PMICs 1 to 6 includes power supply circuits such as a linear regulator and a switching regulator, and generates at least one output voltage from the input voltage.

The PMIC 1 supplies a clock signal CLK to the PMICs 2 to 6 via the first transmission line 7. The PMIC 1 is sometimes referred to as a master circuit below. The PIMCs 2 to 6 are sometimes referred to as slave circuits below, or the PIMCs 2 to 6 are sometimes referred to as slave circuits 1 to 5 below Based on the clock signal CLK, any one of the PMICs 1 to 6 can transmit data to another one via the second transmission line 8. That is, in the power supply system 100, data transmission from the master circuit to the slave circuits, data transmission from one slave circuit to another slave circuit, or data transmission from the slave circuits to the master circuit can be performed. Despite that the power supply system 100 is formed by the plurality of PMICs 1 to 6, by means of the data transmission above, one PMIC can perform various types of processing (for example, processing upon enabling or processing in case of anomaly).

A device ID and a system serial number are to be described below.

Each of the PMICs 1 to 6 includes a storage circuit storing a device ID and a system serial number in a non-volatile manner. It is desired that the device ID and the system serial number stored in the storage circuit above can be re-written.

FIG. 2 shows an exemplary diagram of device IDs and FIG. 3 shows an exemplary diagram of system serial numbers. PN1 and PN2 are different product umbers of PMICs in FIG. 2 and FIG. 3. The number of channels (the number of ch) in FIG. 3 is a total number of output terminals that the power supply system has for outputting output voltages. In power supply systems with the system serial numbers [2] to [11], the number of channels (the number of ch) is greater than the number of PMICs (the number of chips), and the output terminals of the power supply systems are distributed and arranged in the plurality of PMICs.

In the power supply system 100, the storage circuit of the PMIC 1 stores "3'b000" as the device ID, and stores "10" as the system serial number.

In the power supply system 100, the storage circuit of the PMIC 2 stores "3'b011" as the device ID, and stores "10" as the system serial number.

In the power supply system 100, the storage circuit of the PMIC 3 stores "3'b100" as the device ID, and stores "10" as the system serial number.

In the power supply system 100, the storage circuit of the PMIC 4 stores "3'b101" as the device ID, and stores "10" as the system serial number.

In the power supply system 100, the storage circuit of the PMIC 5 stores "3'b110" as the device ID, and stores "10" as the system serial number.

In the power supply system 100, the storage circuit of the PMIC 6 stores "3'b111" as the device ID, and stores "10" as the system serial number.

By means of storing the device IDs and system serial numbers above in the respective storage circuits of the PMICs 1 to 6, the power supply system 100 becomes a power supply system that includes 6 PMICs and a total number (the number of ch) of 17 output terminals for outputting output voltages. The power supply system 100 may be developed by developing two PMICs (with the product numbers PN1 and PN2). Moreover, if two PMICs (with the product numbers PN1 and PN2) are developed, various power supply systems including the power supply system 100 as shown in FIG. 3 can be developed. That is, for example, various power supply systems shown in FIG. 3 can handle diversified customer requirements at low costs.

Communication protocols are to be described below.

Figure 4:
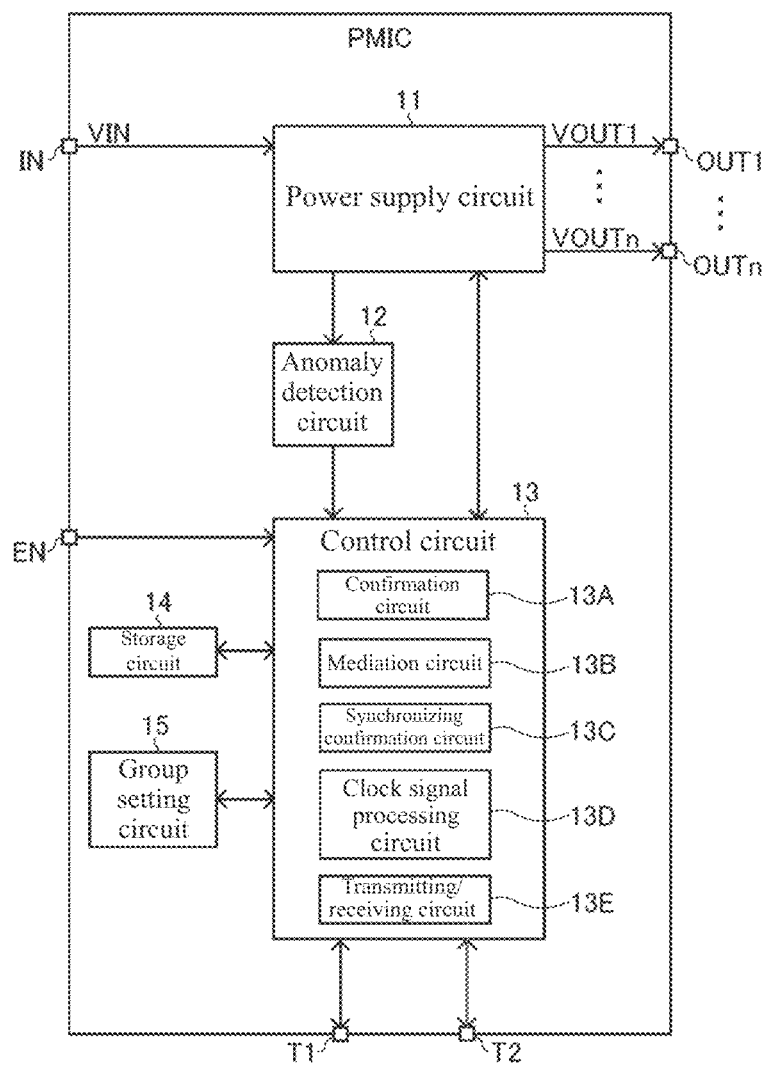
FIG. 4 is a brief configuration diagram of a power management integrated circuit (PMIC).

FIG. 4 shows a brief configuration diagram of a PMIC. The PMIC shown in FIG. 4 includes a power supply circuit 11, an anomaly detection circuit 12, a control circuit 13, a storage circuit 14, a group setting circuit 15, an input terminal IN, output terminals OUT1 to OUTn, a first terminal T1, a second terminal T2 and an enable terminal EN. The PMIC with the product number PN1 includes seven output terminals OUT1 to OUT7, and the PMIC with the product number PN2 includes two output terminals OUT1 and OUT2. In the power supply system 100, the PMIC 1 is the PMIC with the product number PN1, and each of the PMICs 2 to 6 is the PMIC with the product number PN2. Thus, the PMIC 1 includes the seven output terminals OUT1 to OUT7, and each of the PMICs 2 to 6 includes two output terminals OUT1 and OUT2.

The power supply circuit 11 converts an input voltage VIN applied to the input terminal IN to output voltages VOUT1 to VOUTn, and supplies the output voltages VOUT1 to VOUTn to the output terminals OUT1 to OUTn.

The anomaly detection circuit 12 detects anomalies of the power supply circuit 11, and outputs a detection result to the control circuit 13. An example of the anomalies is such as an overvoltage of the output voltages VOUT1 to VOUTn, a low voltage of the output voltages VOUT1 to VOUTn, or an overcurrent of currents supplied to the output terminals OUT1 to OUTn. The anomaly detection circuit 12 stays aware of which system of the output terminals OUT1 to OUTn contains an anomaly and detects the anomaly.

The control circuit 13 controls the power supply circuit 11. In other words, the control circuit 13 manages the power supply circuit 11. The control circuit 13 includes a confirmation circuit 13A, a mediation circuit 13B, a synchronizing confirmation circuit 13C, a clock signal processing circuit 13D and a transmitting/receiving circuit 13E.

The control circuit 13 sets the PMIC to an enabled state when a voltage at a high level is applied to the enable terminal EN, and sets the PMIC to a disabled state when a voltage at a low level is applied to the enable terminal EN.

The confirmation circuit 13A confirms that the second transmission line 8 is currently not transmitting data before the control circuit 13 is to start transmitting data to the second transmission line 8.

When a plurality of the PMICs 1 to 6 are scheduled to transmit data to the second transmission line 8, and before the control circuit 13 starts transmitting data to the second transmission line 8, the mediation circuit 13B mediates an authority of transmitting the data.

The synchronizing confirmation circuit 13C confirms synchronization with the clock signal CLK before the control circuit 13 is to start transmitting data to the second transmission line 8.

When the PMIC is set as the master circuit according to the device ID stored in the storage circuit 14 (when set to a first setting), the clock signal processing circuit 13D outputs the clock signal CLK from the first terminal T1.

When the PMIC is set as the slave circuit according to the device ID stored in the storage circuit 14 (when set to a second setting), the clock signal processing circuit 13D inputs the clock signal CLK from the first terminal T1.

The transmitting/receiving circuit 13E receives, based on the clock signal CLK, data input to the second terminal T2, and transmits, based on the clock signal CLK, data output from the second terminal T2.

The group setting circuit 15 groups the output terminals OUT1 to OUTn. The group setting circuit 15 may be implemented by, for example, a register. Since all output terminals of the power supply system 100 are grouped into a plurality of groups, the group setting circuit 15 of one PMIC may set the output terminals OUT1 to OUTn to one group, or may set the output terminals OUT1 to OUTn to a plurality of groups. It is desired that settings set by the group setting circuit 15 can be modified according to contents stored in the storage circuit 14 or communications with the exterior via an inter-integrated circuit (I2C) bus.

Figure 5:
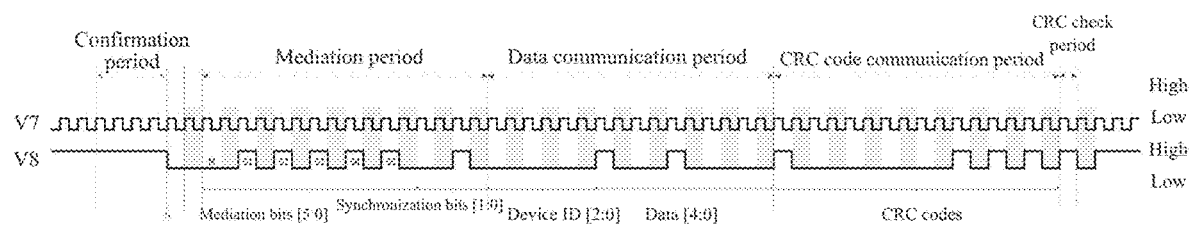
FIG. 5 is a timing diagram of a voltage applied to a first transmission line and a voltage applied to a second transmission line.

FIG. 5 shows a timing diagram of a voltage applied to the first transmission line 7 and a voltage applied to the second transmission line 8. More specifically, FIG. 5 shows a timing diagram of a voltage V7 applied to the first transmission line 7 and a voltage V8 applied to the second transmission line 8 when the PMIC 1 serves as the master circuit that transmits data.

Under data communication protocols of the second transmission line 8, the voltage V8 applied to the second transmission line 8 becomes at a low level at an interval of every one cycle of the clock signal CLK (the gray parts shown in FIG. 5). Thus, if the high level of the voltage V8 applied to the second transmission line 8 lasts for four cycles of the clock signal CLK, data communication of the second transmission line 8 is not performed.

In FIG. 5, if the voltage V8 applied to the second transmission line 8 is kept at a high level during four cycles of the clock signal CLK, the confirmation circuit 13A of the PMIC 1 confirms that the second transmission line 8 is currently not transmitting data. At a timing at which the confirmation is obtained (a timing t1 shown in FIG. 5), the transmitting/receiving circuit 13E of the PCMI 1 switches the voltage V8 applied to the second transmission line 8 from a high level to a low level. Then, the transmitting/receiving circuit 13 of the PMIC 1 sets the voltage V8 applied to the second transmission line 8 to a low level at an interval of one cycle of the clock signal CLK (the gray parts shown in FIG. 5).

The transmitting/receiving circuit 13E of the PMIC 1 sets the voltage V8 applied to the second transmission line 8 to a low level over a predetermined time during a mediation period (the first cycle of the clock signal CLK during the mediation period). Based on the level of the voltage V8 applied to the second transmission line 8 during the mediation period, the mediation circuit 13B of the PMIC 1 confirms that the other PMICs, that is, the PMIC 2 to PCMI 6, are not to start data communication. More specifically, since the voltage V8 applied to the second transmission line 8 is at a high level in one of the $3^{rd}$, $5^{th}$, $7^{th}$, $9^{th}$ and $11^{th}$ cycles of the clock signal CLK during the mediation period, the mediation circuit 13B of the PMIC 1 confirms that the other PMICs, that is, the PMIC 2 to PMIC 6, are not to start data communication.

In the last four cycles of the clock signal CLK within the mediation period, the transmitting/receiving circuit 13E of each of the PMICs 1 to 6 switches the voltage V8 applied to the second transmission line 8 sequentially to a low level, a low level, a high level and a low level in each cycle of the clock signal CLK.

In the last four cycles of the clock signal CLK within the mediation period, the synchronizing confirmation circuit 13C of the PMIC 1 determines whether the voltage V8 applied to the second transmission line 8 sequentially switches to a low level, a low level, a high level and a low level in each cycle of the clock signal CLK. If the voltage V8 applied to the second transmission line 8 does not sequentially switch to a low level, a low level, a high level and a low level in each cycle of the clock signal CLK, the PMICs 1 to 6 are not synchronized, and thus the transmitting/receiving circuit 13E of the PMIC 1 stops data transmission.

If the voltage V8 applied to the second transmission line 8 sequentially switches to a low level, a low level, a high level and a low level in each cycle of the clock signal CLK, the transmitting/receiving circuit 13E of the PMIC 1 sequentially transmits an address of a PMIC as the data transmission destination and transmits data to be transmitted to the PMIC as the data transmission destination during the data transmission period. Then, during a cyclic redundancy check (CRC) code communication period, the transmitting/receiving circuit 13E of the PMIC 1 transmits CRC codes corresponding to the address and the data of the data communication period to the PMIC as the data transmission destination, and the transmitting/receiving circuit 13E of the PMIC as the data transmission destination transmits a CRC check result to the PMIC 1 during a CRC check period.

Figure 6:
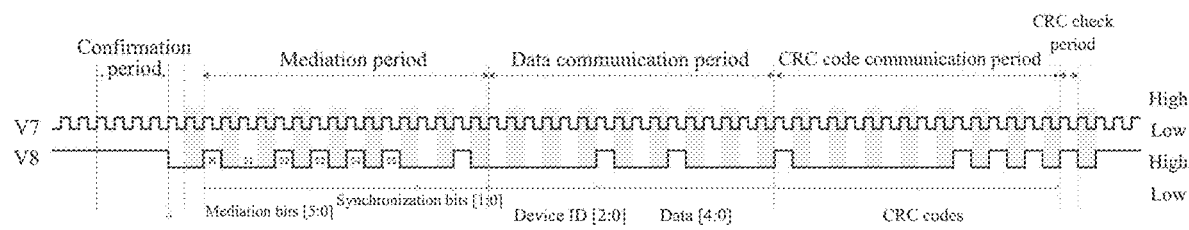
FIG. 6 is a timing diagram of a voltage applied to a first transmission line and a voltage applied to a second transmission line.

FIG. 6 shows a timing diagram of a voltage applied to the first transmission line 7 and a voltage applied to the second transmission line 8. More specifically, FIG. 6 shows a timing diagram of the voltage V7 applied to the first transmission line 7 and the voltage V8 applied to the second transmission line 8 when the PMIC 2 serves as the slave circuit that transmits data.

In FIG. 6, if the voltage V8 applied to the second transmission line 8 across four cycles of the clock signal CLK is at a high level, the confirmation circuit 13A of the PMIC 2 confirms that the second transmission line 8 is currently not transmitting data. At a timing at which the confirmation is obtained (a timing tl shown in FIG. 6), the transmitting/receiving circuit 13E of the PMIC 2 switches the voltage V8 applied to the second transmission line 8 from a high level to a low level. Then, the transmitting/receiving circuit 13E of the PMIC 2 sets the voltage V8 applied to the second transmission line 8 to a low level at an interval of one cycle of the clock signal CLK (the gray parts shown in FIG. 6).

The transmitting/receiving circuit 13E of the PMIC 2 sets the voltage V8 applied to the second transmission line 8 to a low level over a predetermined time during the mediation period (one 3rd cycle of the clock signal CLK during the mediation period). Based on the level of the voltage V8 applied to the second transmission line 8 during the mediation period, the mediation circuit 13B of the PMIC 2 confirms that the other PMICs, that is, the PMICs 1 and 3 to 6, are not to start data communication. More specifically, since the voltage V8 applied to the second transmission line 8 is at a high level in one of the $1^{st}$, $5^{th}$, $7^{th}$, $9^{th}$ and $11^{th}$ cycles of the clock signal CLK during the mediation period, the mediation circuit 13B of the PMIC 2 confirms that the other PMICs, that is, the PMICs 1 and 3 to 6, are not to start data communication.

In the last four cycles of the clock signal CLK within the mediation period, the transmitting/receiving circuit 13E of each of the PMICs 1 to 6 switches the voltage V8 applied to the second transmission line 8 sequentially to a low level, a low level, a high level and a low level in each cycle of the clock signal CLK.

In the last four cycles of the clock signal CLK within the mediation period, the synchronizing confirmation circuit 13C of the PMIC 2 determines whether the voltage V8 applied to the second transmission line 8 sequentially switches to a low level, a low level, a high level and a low level in each cycle of the clock signal CLK. If the voltage V8 applied to the second transmission line 8 does not sequentially switch to a low level, a low level, a high level and a low level in each cycle of the clock signal CLK, the PMICs 1 to 6 are not synchronized, and thus the transmitting/receiving circuit 13E of the PMIC 2 stops data transmission.

If the voltage V8 applied to the second transmission line 8 sequentially switches to a low level, a low level, a high level and a low level in each cycle of the clock signal CLK, the transmitting/receiving circuit 13E of the PMIC 2 sequentially transmits an address of a PMIC as the data transmission destination and transmits data to be transmitted to the PMIC as the data transmission destination during the data transmission period. Then, during the CRC code communication period, the transmitting/receiving circuit 13E of the PMIC 2 transmits CRC codes corresponding to the address and the data of the data communication period to the PMIC as the data transmission destination, and the transmitting/receiving circuit 13E of the PMIC as the data transmission destination transmits a CRC check result to the PMIC 1 during the CRC check period.

Figure 7:
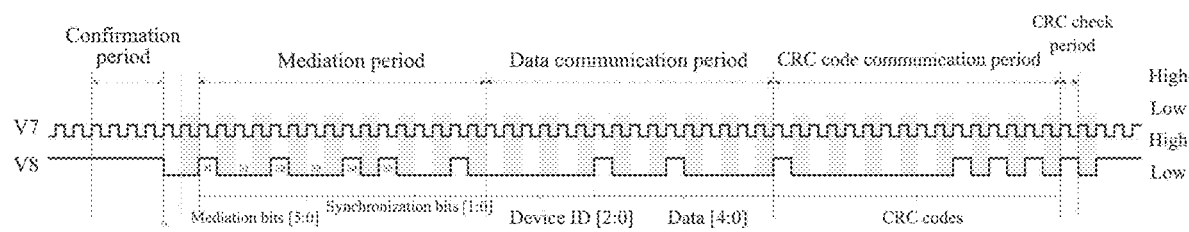
FIG. 7 is a timing diagram of a voltage applied to a first transmission line and a voltage applied to a second transmission line.

FIG. 7 shows a timing diagram of a voltage applied to the first transmission line 7 and a voltage applied to the second transmission line 8. More specifically, FIG. 7 shows a timing diagram of the voltage V7 applied to the first transmission line 7 and the voltage V8 applied to a second transmission line 8 when the PMIC 2 serving as a slave circuit 1 and the PMIC 4 serving as a slave circuit 3 substantially simultaneously switch the voltage V8 applied to the second transmission line 8 from a high level to a low level.

In FIG. 7, if the voltage V8 applied to the second transmission line 8 across four cycles of the clock signal CLK is at a high level, the confirmation circuit 13A of each of the PMICs 2 and 4 confirms that the second transmission line 8 is currently not transmitting data. At a timing at which the confirmation is obtained (a timing tl shown in FIG. 7), the transmitting/receiving circuit 13E of each of the PMICs 2 and 4 switches the voltage V8 applied to the second transmission line 8 from a high level to a low level. Then, the transceiver 13 of each of the PMICs 2 and 4 sets the voltage V8 applied to the second transmission line 8 to a low level at an interval of one cycle of the clock signal CLK (the gray parts shown in FIG. 7) till the mediation period ends; once the mediation period has ended, the transmitting/receiving circuit 13E of the PMIC 4 sets the voltage V8 applied to the second transmission line 8 to a low level at an interval of one cycle of the clock signal CLK (the gray parts shown in FIG. 7).

The transmitting/receiving circuit 13E of the PMIC 2 sets the voltage V8 applied to the second transmission line 8 to a low level over a predetermined time during the mediation period (one 3rd cycle of the clock signal CLK during the mediation period). The transmitting/receiving circuit 13E of the PMIC 4 sets the voltage V8 applied to the second transmission line 8 to a low level over a predetermined time during the mediation period (one 7th cycle of the clock signal CLK during the mediation period). Based on the level of the voltage V8 applied to the second transmission line 8 during the mediation period, the mediation circuit 13B of the PMIC 2 confirms that the other PMIC, that is, the PMIC 4, is to start data communication. More specifically, since the voltage V8 applied to the second transmission line 8 is at a low level in one 7th cycle of the clock signal CLK during the mediation period, the mediation circuit 13B of the PMIC 2 confirms that the other PMIC, that is, the PMIC 4, is to start data communication. Based on the level of the voltage V8 applied to the second transmission line 8 during the mediation period, the mediation circuit 13B of the PMIC 4 confirms that the other PMIC, that is, the PMIC 2, is to start data communication. More specifically, since the voltage V8 applied to the second transmission line 8 is at a low level in one 3rd cycle of the clock signal CLK during the mediation period, the mediation circuit 13B of the PMIC 4 confirms that the other PMIC, that is, the PMIC 2, is to start data communication.

In the last four cycles of the clock signal CLK within the mediation period, the transmitting/receiving circuit 13E of each of the PMICs 1 to 6 switches the voltage V8 applied to the second transmission line 8 sequentially to a low level, a low level, a high level and a low level in each cycle of the clock signal CLK.

In the last four cycles of the clock signal CLK within the mediation period, the synchronizing confirmation circuit 13C of the PMIC 2 determines whether the voltage V8 applied to the second transmission line 8 sequentially switches to a low level, a low level, a high level and a low level in each cycle of the clock signal CLK. If the voltage V8 applied to the second transmission line 8 does not sequentially switch to a low level, a low level, a high level and a low level in each cycle of the clock signal CLK, the PMICs 1 to 6 are not synchronized, and thus the transmitting/receiving circuit 13E of the PMIC 2 stops data transmission.

If the voltage V8 applied to the second transmission line 8 sequentially switches to a low level, a low level, a high level and a low level in each cycle of the clock signal CLK, the transmitting/receiving circuit 13E of the PMIC 2 sequentially transmits an address of a PMIC as the data transmission destination and transmits data to be transmitted to the PMIC as the data transmission destination during the data transmission period. Then, during the CRC code communication period, the transmitting/receiving circuit 13E of the PMIC 2 transmits CRC codes corresponding to the address and the data of the data communication period to the PMIC as the data transmission destination, and the transmitting/receiving circuit 13E of the PMIC as the data transmission destination transmits a CRC check result to the PMIC 1 during the CRC check period.

The storage circuit 14 of each PMIC stores priorities with respect to conflicts of starting of data communication. In this embodiment, the priority of the PMIC 4 is set to be higher than that of the PMIC 2.

The PMIC 2 gives up the starting of data communication since the PMIC 4 having a higher priority is to start data communication.

In the last four cycles of the clock signal CLK within the mediation period, the synchronizing confirmation circuit 13C of the PMIC 4 determines whether the voltage V8 applied to the second transmission line 8 sequentially switches to a low level, a low level, a high level and a low level in each cycle of the clock signal CLK. If the voltage V8 applied to the second transmission line 8 does not sequentially switch to a low level, a low level, a high level and a low level in each cycle of the clock signal CLK, the PMICs 1 to 6 are not synchronized, and thus the transmitting/receiving circuit 13E of the PMIC 4 stops data transmission.

If the voltage V8 applied to the second transmission line 8 sequentially switches to a low level, a low level, a high level and a low level in each cycle of the clock signal CLK, the transmitting/receiving circuit 13E of the PMIC 4 sequentially transmits an address of a PMIC as the data transmission destination and transmits data to be transmitted to the PMIC as the data transmission destination during the data transmission period. Then, during the CRC code communication period, the transmitting/receiving circuit 13E of the PMIC 4 transmits CRC codes corresponding to the address and the data of the data communication period to the PMIC as the data transmission destination, and the transmitting/receiving circuit 13E of the PMIC as the data transmission destination transmits a CRC check result to the PMIC 1 during the CRC check period.

Because a confirmation period is provided in the power supply system 100, conflicts of data transmission of the plurality of PMICs can be avoided. Moreover, with the mediation period provided in the power supply system 100, even in case of close timings of starting of data transmission of a plurality of PMICs, conflicts of data transmission of the plurality of PMICs can still be avoided.

Disablement of group circuits is to be described below.

The group setting circuit of the power supply system 100 includes the respective group setting circuits 15 of the PMICs 1 to 6.

The control circuit of the power supply system 100 includes the control circuits 13 of the PMICs 1 to 6, and is configured to stop an output from the output terminals belonging to groups in which an anomaly is detected by the respective anomaly detection circuits 12 of the PMICs 1 to 6, and maintain an output from the output terminals belonging to groups in which an anomaly is not detected by the respective anomaly detection circuits 12 of the PMICs 1 to 6.

Herein, the 17 output terminals of the power supply system 100 are divided into four groups (group A to group D) for description.

Figure 8:
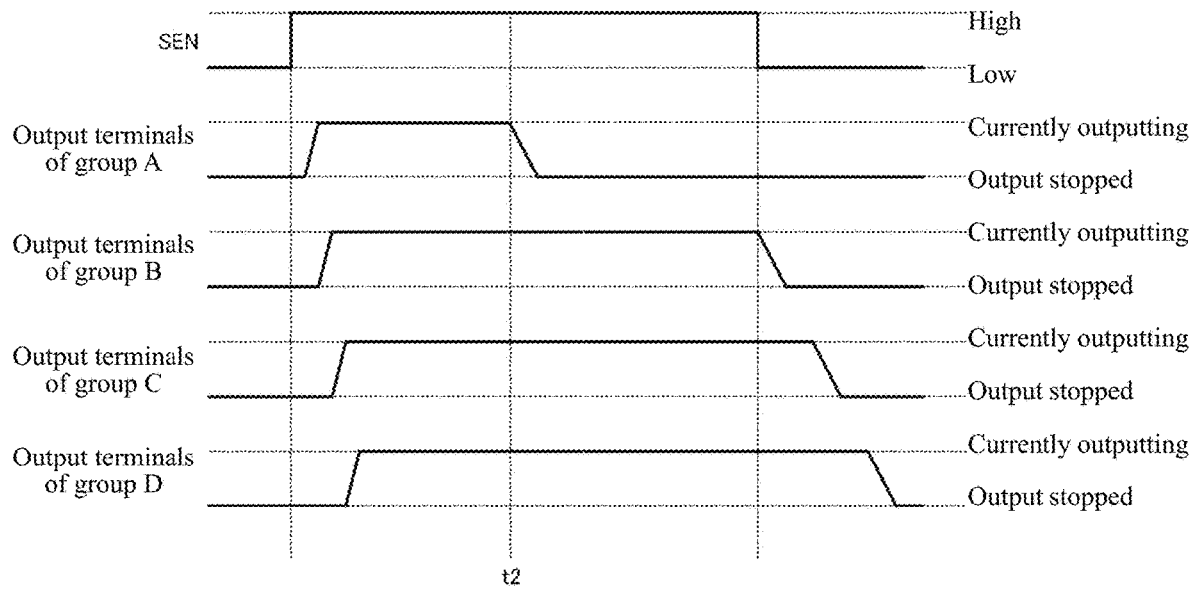
FIG. 8 is an exemplary timing diagram of a power supply system in an output state.

FIG. 8 shows an exemplary timing diagram of the power supply system 100 in an output state. Moreover, FIG. 8 shows a timing diagram when an anomaly occurs in the group A after being enabled. An enable signal SEN in FIG. 8 is supplied to the respective enable terminals EN of the PMICs 1 to 6.

When the enable signal SEN switches from a low level to a high level, the output from the output terminals of the group A to the output from the output terminals of the group D are sequentially enabled. In the example in FIG. 8, the control circuit of the power supply system 100 is enabled in sequence of the group A, the group B, the group C and the group D.

At a timing t2 at which an anomaly occurs in the group A, the control circuit of the power supply system 100 stops the output from the output terminals of the group A, and maintains the output from the output terminals of the group B to the group D in which no anomaly is detected. Thus, a power supply system having a degree of freedom for processing in case of an anomaly is achieved.

When the enable signal SEN switches from a high level to a low level, the output from the output terminals of the group A to the output from the output terminals of the group D are sequentially stopped. In the example in FIG.8, since the output from the output terminals of the group A is stopped due to the anomaly, the stopping of the output from the output terminals of the group A is skipped, and the output from the output terminals of the group B to the output from the output terminals of the group D are stopped sequentially.

Figure 9:
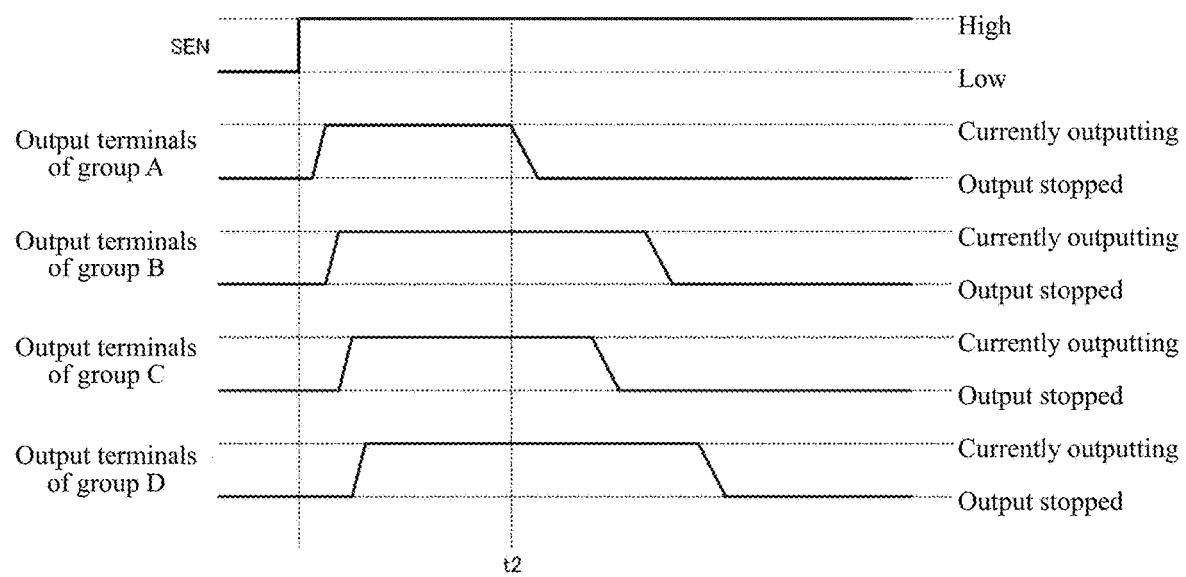
FIG. 9 is another exemplary timing diagram of a power supply system in an output state.

Moreover, as shown in FIG. 9, after the outputs from the output terminals of the group B to the group D in which no anomaly is detected are maintained, the control circuit of the power supply system 100 sequentially stops the outputs from the output terminals of at least one of the group B to the group D in which no anomaly is detected. In the example in FIG. 9, for all the outputs from the output terminals of the group B to the group D in which no anomaly is detected, the control circuit of the power supply system 100 stops the outputs in sequence of the group B, the group C and the group D. Thus, a power supply system having a degree of freedom for processing in case of an anomaly is achieved.

Figure 10:
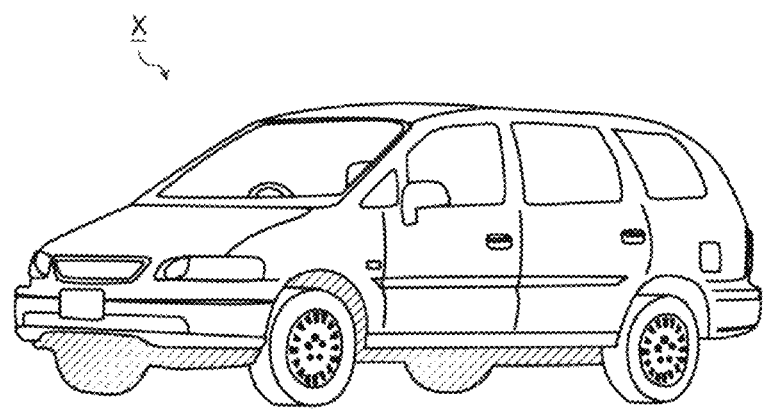
FIG. 10 is a diagram showing the appearance of a vehicle according to an embodiment.

FIG. 10 is a diagram showing the appearance of a vehicle X according to an embodiment. The vehicle X includes the power supply system 100. Moreover, the vehicle X includes a battery (not shown). An output voltage of the battery (not shown) is input voltages of the PMICs 1 to 6. The power supply system 100 is a power supply device of a plurality of on-vehicle machines (not shown) mounted in the vehicle X.

In addition, various modifications may be made to the embodiments above without departing from the scope of the subject matter of the present disclosure. It should be noted that, all the details of the embodiments above are illustrative rather than limitative, and a person skilled in the art should understand that the technical scope of the present disclosure is disclosed by the appended claims instead of the descriptions of the embodiments above. Moreover, the technical scope also includes meanings equivalent to the appended claims and all variations encompassed within the scope of the appended claims.

For example, the method of data communication among the PMICs 1 to 6 may also be a form besides the embodiments above.

The power supply system 100 above is configured to include six PMICs; however, the total number of the PMICs (the first semiconductor integrated circuit and the second semiconductor integrated circuit) included in a power supply system is not limited to being six, but may be five or less or be seven or more.

Moreover, as power supply systems including a plurality of PMICs, FIG. 3 only depicts the two power supply systems (the power supply system with the system serial number [2] and the power supply system with the system serial number [3]) including two PMICs, two power supply systems (the power supply system with the system serial number [4] and the power supply system with the system serial number [5]) including three PMICs, two power supply systems (the power supply system with the system serial number [6] and the power supply system with the system serial number [7]) including four PMICs, two power supply systems (the power supply system with the system serial number [8] and the power supply system with the system serial number [9]) including five PMICs, and two power supply systems (the power supply system with the system serial number [10] and the power supply system with the system serial number [11]) including six PMICs; however, these power supply systems are merely examples for illustration purposes.

In addition, the power supply system may also be, for example, configured to include one single PMIC. In this case, the PMIC only needs to include a plurality of output terminals, and the plurality of output terminals are divided into a plurality of groups.

The invention claimed is:

1. A power supply system, comprising:
a plurality of output terminals, configured to output an output voltage;
a group setting circuit, configured to group the plurality of output terminals;
an anomaly detection circuit, configured to detect anomaly;
a control circuit, configured to stop an output from the output terminals belonging to groups in which an anomaly is detected by the anomaly detection circuit, and maintain an output from the output terminals belonging to in which no anomaly is detected by the anomaly detection circuit, until the power supply system is switched from an enabled state to a disabled state;
a plurality of semiconductor integrated circuits (ICs), wherein a number of the plurality of output terminals is greater than a number of the plurality of semiconductor ICs, and the plurality of output terminals are distributed and arranged in the plurality of semiconductor ICs;
a first transmission line; and
a second transmission line,
wherein:
the plurality of semiconductor ICs include a single first semiconductor IC and at least one second semiconductor IC,
the single first semiconductor IC is configured to supply a clock signal to the at least one second semiconductor IC via the first transmission line, and
based on the clock signal, a first one of the single first semiconductor IC and the at least one second semiconductor IC is configured to transmit data via the second transmission line to a second one of the single first semiconductor IC and the at least one second semiconductor IC.

2. The power supply system of claim 1, wherein when the power supply system is switched from the enabled state to the disabled state, the control circuit is configured to sequentially stop outputs from the plurality of output terminals belonging to all of the groups.

3. The power supply system of claim 1, wherein after the output from the output terminals belonging to the groups in which the anomaly is not detected by the anomaly detection circuit is maintained, the control circuit is configured to sequentially stop the output from the output terminals belonging to at least one of the groups in which the anomaly is not detected by the anomaly detection circuit.

4. The power supply system of claim 2, wherein after the output from the output terminals belonging to the groups in which the anomaly is not detected by the anomaly detection circuit is maintained, the control circuit is configured to sequentially stop the output from the output terminals belonging to at least one of the groups in which the anomaly is not detected by the anomaly detection circuit.

5. The power supply system of claim 1, wherein each of the plurality of semiconductor ICs includes a storage circuit that stores whether the semiconductor IC itself is set to the first semiconductor IC or the second semiconductor IC.

6. The power supply system of claim 1, further comprising a single semiconductor IC, wherein the plurality of output terminals are arranged in the single semiconductor IC.

7. The power supply system of claim 2, further comprising a single semiconductor IC, wherein the plurality of output terminals are arranged in the single semiconductor IC.

8. The power supply system of claim 3, further comprising a single semiconductor IC, wherein the plurality of output terminals are arranged in the single semiconductor IC.

9. The power supply system of claim 4, further comprising a single semiconductor IC, wherein the plurality of output terminals are arranged in the single semiconductor IC.

10. A vehicle, comprising the power supply system of claim 1.

11. A vehicle, comprising the power supply system of claim 2.

12. A vehicle, comprising the power supply system of claim 3.

13. A vehicle, comprising the power supply system of claim 5.

* * * * *